Patented Oct. 13, 1936

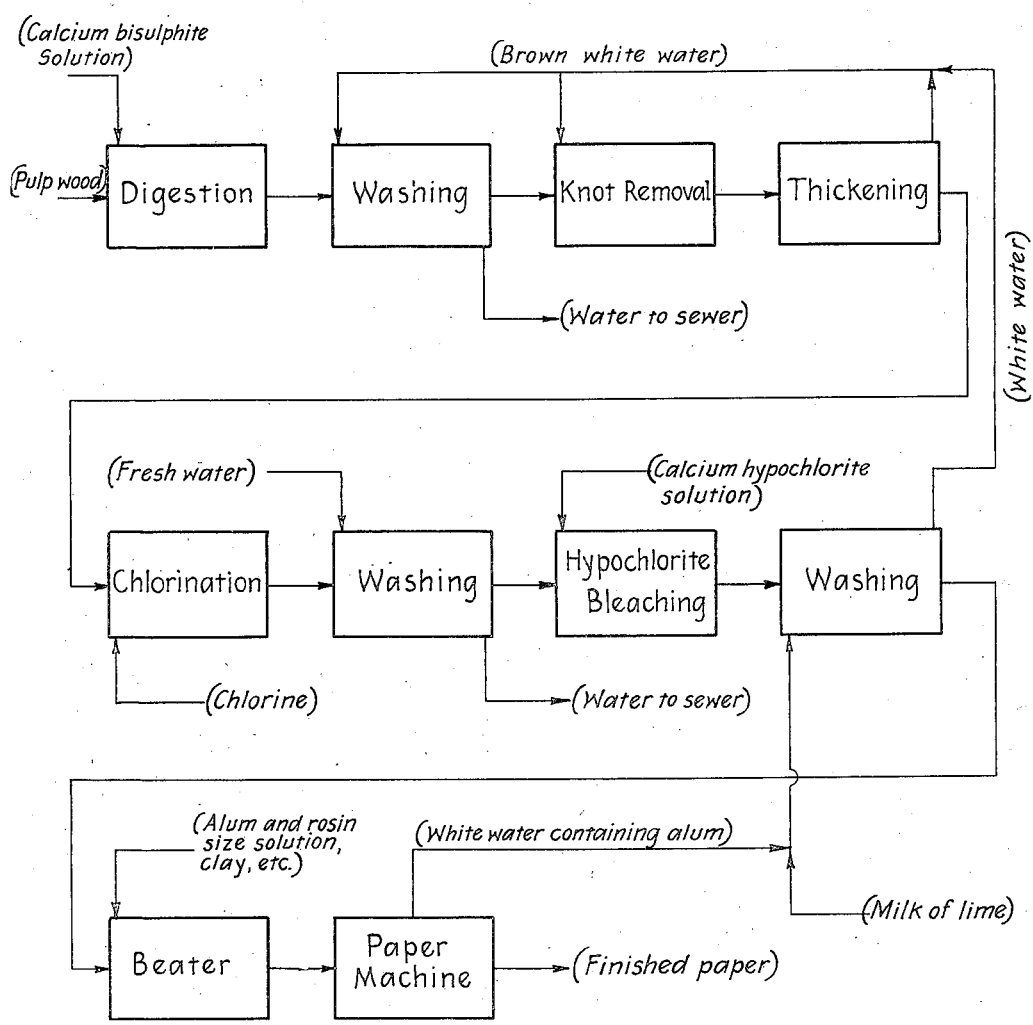

2,057,059

UNITED STATES PATENT OFFICE 2,057,059

TREATMENT OF SULPHITE PROCESS PAPER MACHINE EFFLUENT

John D. Rue, Niagara Falls, N. Y., assignor to Hooker Electrochemical Company, New York, N. Y., a corporation of New York Application November 5, 1935, Serial No. 48,374

10 Claims. (Cl. 92—1)

More particularly, my invention relates to a treatment of effluent water from the paper making machine, so that the same can be returned to earlier stages of the process and reused, without the objectionable consequences heretofore attendant upon such reuse. One object of my invention is therefore to conserve the water supply and thus reduce the water-meter charge, if the water be purchased, or the cost of pumping and filtering, if a natural water supply be available. Another object of my invention is to reduce the quantity of clay and rosin size used in the production of the paper. Still another object of my invention is to deposit in the paper, as so much extra filler, the alum which is otherwise wasted as soluble aluminum sulphate and at the same time, by reducing the acidity of the paper machine effluent, to protect the pipes and valves used for its conveyance.

In another aspect of my invention, among its objects are to reduce the quantity of bleach liquor necessary to produce a given bleaching effect and to improve the quality of the paper made from the bleached pulp.

In the operation of sulphite paper mills, one of the difficulties contended with is the occurrence of dark specks in the paper. These specks are due, not so much to foreign matter, as to unbleached particles occurring naturally in the wood itself. These are particles of a resinous nature which can be bleached but which, being more difficult to bleach than the bulk of the pulp, are likely to remain as unbleached particles or specks after the bulk of the pulp has been bleached to a satisfactory whiteness. To fully bleach out all the specks would require a more drastic treatment and a greater consumption of chemicals and would result in a greater degradation of the pulp. For this reason, it is customary to strike a medium and, while tolerating a few specks, to keep the speck count within certain limits, depending upon the grade of paper to be produced.

The effluent water from the paper machines is termed in the paper making art "paper mill white water", to distinguish it from the pulp mill white water, which normally contains no alum. It contains small quantities of fine fiber, clay filler, etc., in suspension and in solution the residual aluminum sulphate and rosin size which are added to render the paper more water repellent. It has an acidity of pH 4.2 to 4.6.

If this paper mill white water is returned to the pulp mill process in advance of the bleaching step, as for washing or diluting the freshly digested stock, the otherwise nearly neutral water associated with the unbleached stock is rendered decidedly acid. This results in increased consumption of calcium hypochlorite bleach liquor in the subsequent bleaching step, a lowering of the whiteness and an increase in the speck count of the finished paper.

These effects appear to be due to reaction between the sulphite waste liquor and the alum in the paper mill white water. Thus, I have found that if an alum solution of about the same acidity as that of the untreated paper mill white water be added to the freshly digested pulp the above noted harmful effects will follow. This indicates that the alum is in some way responsible. It seems reasonable to suppose that the alum reacts with the coloring matter of the sulphite liquor to fix it upon the fibers. It might also be expected that the alum would react with the resinous specks to render them resistant to water penetration, in much the same way as that in which it reacts with the sodium resinate of the paper size to render the paper water-resistant. Either or both of these reactions would tend to increase the quantity of bleach liquor necessary to produce a given bleaching effect; also to increase the number and prominence of the specks.

For these reasons, when a fine grade of paper is to be produced it has hitherto been necessary to run a large part of the paper mill white water to waste and replace it with fresh water for washing the unbleached pulp. This practice results in an excessive demand for water and necessitates a heavy investment in pumping and filtering equipment and storage reservoir capacity. Moreover, substantial values in aluminum sulphate, clay and rosin size are lost.

I have discovered that by rendering the paper mill white water neutral or alkaline, as by the addition of lime, a white precipitate of aluminum hydroxide is formed; this can be easily removed by filtration and the filtered water can then be used for washing or diluting the unbleached pulp or wherever else in the process it may be needed, without harmful results.

For the purpose of precipitating the alum I bring the pH of the paper mill white water to not less than 6 and preferably to between 7 and 8. This can best be done by admitting a continuous stream of milk of lime into the stream of white water.

Unless the precipitated aluminum hydroxide be first filtered out, if the treated paper mill white water be returned to the process ahead of the bleaching step the harmful effects above noted will result. I have discovered, however, that the paper mill white water that has been treated or rendered neutral or alkaline, in accordance with my invention, may be returned without filtration to the process immediately following the bleaching step, and used for washing the bleached pulp. In this washing step the water will be passed through a bed of bleached pulp and the precipitated material will be filtered out and remain in the pulp. The filtrate may then be carried further back in the process and reused for washing unbleached pulp. Thus the filtration of the treated paper mill white water may be dispensed with. The material that is filtered out, consisting of aluminum hydroxide, goes along with the pulp through the beater and eventually serves a useful purpose as filler in the paper. Moreover, the neutralization of the white water prolongs the life of the piping and valves used for its conveyance.

Referring to the drawing:

This illustrates the flow sheet of a typical sulphite pulp and paper mill, embodying my invention.

For the sake of simplicity, closely related steps, which may in practice involve several types of apparatus, are grouped together in one heading. Storage chests, for example, are omitted. It will be seen, therefore, that the process comprises essentially a sulphite digestion as with calcium bisulphite solution, washing, knot removal, thickening, chlorination, washing, hypochlorite bleaching, washing and beating, before the pulp finally enters the paper machine and is made up into the finished product.

After the digestion step, the pulp is given a washing to remove sulphite liquor and residues. From here it passes to the knot removal facilities and screens. Excess water is removed in the thickener and recirculated to the washing and knot removal steps. If a chlorination step is included, it will preferably be in accordance with the process of Patent No. 2,001,268 issued to me on May 14, 1935. The process of this patent leaves a quantity of chlorinated matter in solution in the water of the suspension. After chlorination, therefore, there is a thorough washing, for which purpose fresh water is introduced. This washing carries out the bulk of the chlorinated non-cellulosic material and constitutes one of the principal points of scavenging for the process. At this point calcium hypochlorite bleach liquor is introduced. Following the hypochlorite bleaching step the pulp is washed again. The water from this washing is reused for the purpose of washing the unbleached pulp, as illustrated in the drawing. After it has been washed, the bleached pulp goes to the beater, where alum, clay and rosin size are added. The pulp is then ready for introduction into the paper machine, where it is made up into paper. The white water effluent extracted by this machine is passed through a "save-all" (not illustrated) which removes most of the fine fiber that may have passed through the paper machine. From this point the white water in a continuous stream is mixed with a continuous stream of milk of lime in predetermined proportions and the resulting stream of treated white water is returned to the washing step intermediately following the bleaching step, as illustrated. In this washing operation the precipitated aluminum hydroxide is filtered out and remains with the pulp. The wash water is therefore free from alum and may be used for washing unbleached pulp as illustrated in the drawing and above described.

By returning the white water to the process in advance of the beater, any residues of clay or rosin size which it may contain become available for reuse.

Obviously caustic soda or soda ash might be used instead of the milk of lime.

I claim as my invention:

1. The treatment of paper mill white water derived from the pulp and paper process which includes a hypochlorite pulp bleaching step, said white water containing aluminum sulphate, which treatment comprises converting said aluminum sulphate to an insoluble compound of aluminum, filtering the white water containing said compound through said pulp following said bleaching step and returning the filtrate to said process ahead of said bleaching step.

2. The treatment of paper mill white water derived from the pulp and paper process which includes a hypochlorite pulp bleaching step, said white water containing aluminum sulphate, which treatment comprises reacting upon said aluminum sulphate with an alkali, filtering the white water containing the precipitate thus formed through said pulp following said bleaching step and returning the filtrate to said process ahead of said bleaching step.

3. The treatment of paper mill white water derived from the pulp and paper process which includes a hypochlorite pulp bleaching step, said white water containing aluminum sulphate, which treatment comprises reacting upon said aluminum sulphate with milk of lime, filtering the white water containing the precipitate thus formed through said pulp following said bleaching step and returning the filtrate to said process ahead of said bleaching step.

4. The treatment of paper mill white water derived from the pulp and paper process which includes a sulphite wood digestion step followed by a hypochlorite pulp bleaching step, said white water containing aluminum sulphate, which treatment comprises converting the aluminum sulphate to an insoluble compound of aluminum, filtering the white water containing said compound through said pulp following said bleaching step and returning the filtrate to said process at a point between said digestion and bleaching steps.

5. The treatment of paper mill white water derived from the pulp and paper process which includes a sulphite wood digestion step followed by a hypochlorite pulp bleaching step, said white water containing aluminum sulphate, which treatment comprises reacting upon said aluminum sulphate with an alkali, filtering the white water containing the precipitate thus formed through said pulp following said bleaching step and returning the filtrate to the process at a point between said digestion and said bleaching steps.

6. The treatment of paper mill white water derived from the pulp and paper process which includes a sulphite wood digestion step followed by a hypochlorite pulp bleaching step, said white water containing aluminum sulphate, which treatment comprises reacting upon said aluminum sulphate with milk of lime, passing the white water containing the precipitate thus formed through said pulp following said bleaching step and returning the filtrate to the process at a point between said digestion and bleaching steps.

7. The process of producing paper from wood which comprises, successively, (1) digesting the wood to a pulp by means of a solution of calcium bisulphite, (2) washing said pulp, (3) bleaching said pulp by means of a solution of calcium hypochlorite, (4) washing said pulp, (5) adding a solution of alum and rosin size to said pulp, (6) extracting from said pulp white water containing residual alum, (7) precipitating the alum from said white water, (8) utilizing said white water for the purpose of step (4) while leaving the precipitated alum behind in the pulp, and (9) utilizing the wash water from step (4) for the purpose of step (2).

8. The process of producing paper from wood which comprises successively (1) digesting the wood to a pulp by means of a solution of calcium bisulphite, (2) washing said pulp, (3) chlorinating said pulp, (4) washing said pulp, (5) bleaching said pulp by means of a solution of calcium hypochlorite, (6) washing said pulp, (7) adding a solution of alum and rosin size to said pulp, (8) extracting from said pulp white water containing residual alum, (9) precipitating the alum from said white water, (10) utilizing said white water for the purpose of step (6) while leaving the precipitated alum behind in the pulp and (11) utilizing the wash water from step (6) for the purpose of step (2).

9. The process of producing paper from wood pulp which comprises (1) bleaching said pulp, (2) washing said pulp, (3) adding alum to said pulp, (4) extracting from said pulp white water containing residual alum, (5) precipitating the alum from said white water, (6) utilizing said white water for the purpose of step (2) while leaving behind in the pulp the precipitated alum and (7) returning the wash water from step (2) to the system ahead of step (1).

10. The process of producing paper from wood pulp which comprises (1) chlorinating said pulp, (2) washing said pulp, (3) bleaching said pulp by means of calcium hypochlorite, (4) washing said pulp, (5) adding alum to said pulp, (6) extracting from said pulp white water containing residual alum, (7) precipitating the alum from said white water, (8) utilizing said white water for the purpose of step (4) while leaving behind in the pulp the precipitated alum and (9) returning the wash water from step (4) to the system ahead of step (1).

JOHN D. RUE.